United States Patent
Hsing

(10) Patent No.: US 9,036,973 B2
(45) Date of Patent: May 19, 2015

(54) WIRE CONNECTION AND DISTRIBUTION CASING WITH CONNECTING PART, HOLLOW PIPE COLUMNS AND CONNECTED PART FOR COMMUNICATION CABLES

(75) Inventor: Chih Kuang Hsing, New Taipei (TW)

(73) Assignee: YU-FEN CHI (TW)

( * ) Notice: Subject to any disclaimer, the term of this patent is extended or adjusted under 35 U.S.C. 154(b) by 393 days.

(21) Appl. No.: 13/582,001

(22) PCT Filed: Mar. 3, 2010

(86) PCT No.: PCT/CN2010/070853
§ 371 (c)(1),
(2), (4) Date: Dec. 11, 2012

(87) PCT Pub. No.: WO2011/106934
PCT Pub. Date: Sep. 9, 2011

(65) Prior Publication Data
US 2013/0077928 A1    Mar. 28, 2013

(51) Int. Cl.
*G02B 6/00*    (2006.01)
*G02B 6/42*    (2006.01)
*G02B 6/44*    (2006.01)
(Continued)

(52) U.S. Cl.
CPC ............... *H02G 15/10* (2013.01); *H01R 4/72* (2013.01); *H02G 15/013* (2013.01); *G02B 6/4441* (2013.01); *G02B 6/4444* (2013.01); *H01R 13/52* (2013.01)

(58) Field of Classification Search
USPC .................... 385/135, 136, 137, 147
See application file for complete search history.

(56) References Cited

U.S. PATENT DOCUMENTS 3,395,382 A * 7/1968 Weagant ............... 439/523
4,570,032 A * 2/1986 Charlebois et al. ......... 174/84 R
(Continued)

FOREIGN PATENT DOCUMENTS

CN    200994030    12/2007
DE    3127869    2/1983
(Continued)

OTHER PUBLICATIONS

Office Action issued in corresponding Egyptian Patent Application No. 2012091489 on May 2, 2014, consisting of 7 pp. (English Translation Provided).
(Continued)

*Primary Examiner* — Akm Enayet Ullah
(74) *Attorney, Agent, or Firm* — Volpe and Koenig, P.C.

(57) ABSTRACT

A wire connection and distribution casing with a connecting part, hollow pipe columns and a connected part for communication cables includes at least one cable inlet and outlet end face and at least one connected part. At least one connecting part and at least one hollow pipe column which is provided for the communication cables penetrating through the cable inlet and outlet end face and entering into the wire connection and distribution casing for the communication cables are formed on the cable inlet and outlet end face, and the communication cables which are to penetrate through the hollow pipe columns form waterproof structures by means of elastic shrinkable pipes. The connected part may form a waterproof structure by combining with the connecting part. The invention involves many problems which result from the waterproof means of the wire connection and distribution casing for the communication cables in the prior art.

20 Claims, 16 Drawing Sheets

(51) Int. Cl.
*H02G 15/10* (2006.01)
*H01R 4/72* (2006.01)
*H02G 15/013* (2006.01)
*H01R 13/52* (2006.01)

(56) References Cited

U.S. PATENT DOCUMENTS

| | | | |
|---|---|---|---|
| 4,679,896 A * | 7/1987 | Krafcik et al. | 385/135 |
| 5,059,748 A * | 10/1991 | Allen et al. | 174/87 |
| 5,323,480 A * | 6/1994 | Mullaney et al. | 385/135 |
| 6,329,601 B1 * | 12/2001 | Bulford | 174/91 |
| 2013/0077928 A1 * | 3/2013 | Hsing | 385/135 |

FOREIGN PATENT DOCUMENTS

| | | |
|---|---|---|
| EP | 0841734 A1 | 5/1998 |
| JP | 6243913 | 9/1994 |
| JP | 2002-139634 | 5/2002 |
| JP | 2004146177 | 5/2004 |
| NZ | 239785 | 9/1993 |
| WO | 9933154 | 7/1999 |
| WO | 0038291 | 6/2000 |

OTHER PUBLICATIONS

New Zealand Office Action.

* cited by examiner

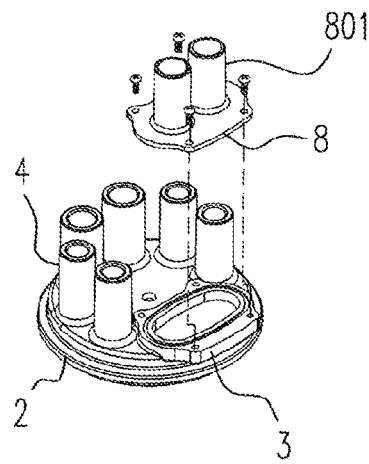
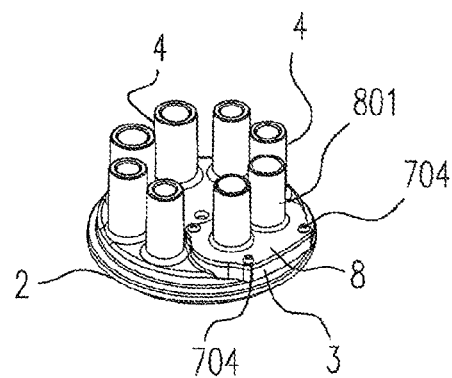
Fig. 6(a)          Fig. 6(b)
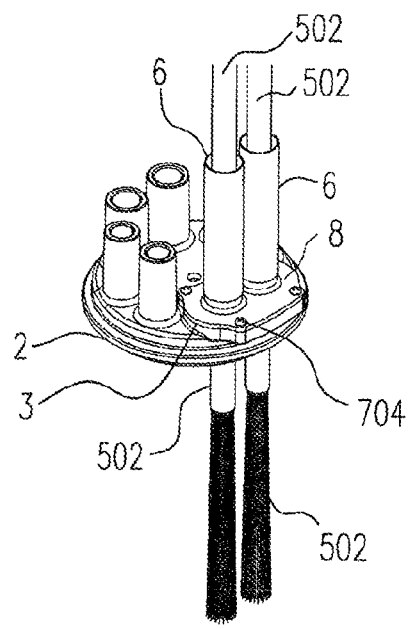
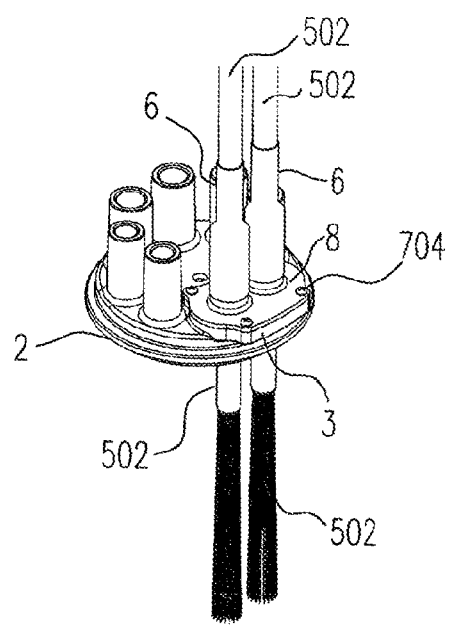
Fig. 6(c)          Fig. 6(d)

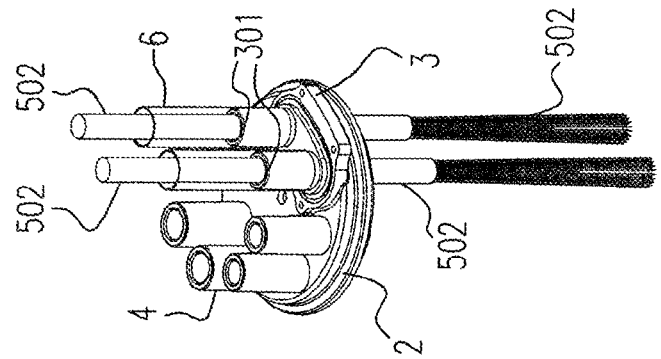
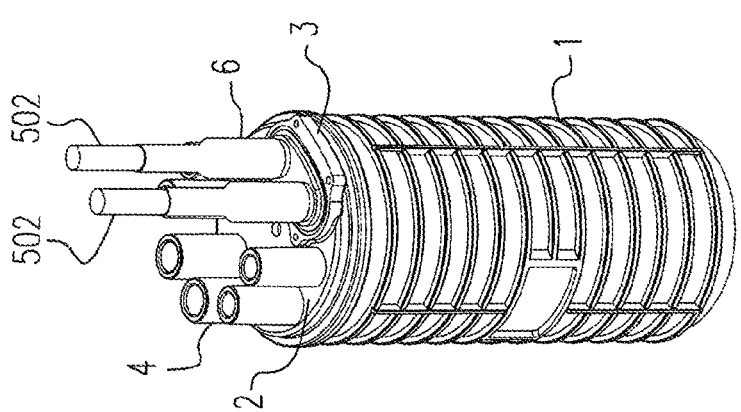
Fig. 8(a)     Fig. 8(b)     Fig. 8(c)

WIRE CONNECTION AND DISTRIBUTION CASING WITH CONNECTING PART, HOLLOW PIPE COLUMNS AND CONNECTED PART FOR COMMUNICATION CABLES

FIELD OF INVENTION

The present invention relates to a communication cable splice enclosure with a connecting portion, a connected portion and a hollow elongate cylindrical member (abbreviated as "cylindrical member" thereinafter). In particular, the present invention relates to a communication cable splice enclosure for improving the waterproof capacity upon introducing the cable, so that the functions of the communication cable splice enclosure are enhanced, the construction quality and safety are increased and the enterprise's cost is decreased. The problems including the insufficient waterproof capability, the inconsistent construction quality, the increasing repair and operation cost and the worse construction safety, etc., in the currently used communication cable splice enclosures can be solved.

BACKGROUND

In the technical fields of the wired transmission, e.g. telecommunication, cable TV and monitoring system, etc., copper cables and optic cables for communication are essential in the transmission of voice, data and image/video, and communication cables for transmitting information are spliced and branched in the communication cable splice enclosure. Since the transmission quality of copper conductors and optic cables would be influenced in the high humidity and in the water, it results in the transmission hindrance and the aging of copper conductors and optic cables. Therefore, the protection layer and the jacket having waterproof/anti-humidity capability are packaged on the communication cables. However, the protection layer of the conductor must be peeled, so that the splicing and branching operations can be performed in the communication cable splice enclosure. Thus, the communication cable splice enclosure must own the waterproof/anti-humidity capabilities to protect the cables from water or humidity, so that the transmission quality is not influenced and the transmission hindrance and the aging of copper conductors and optic cables would not be made. Since the distribution of communication cables in each country is focused on underground and cables mainly are distributed in the ducts below ground, a plenty of communication cable splice enclosures must be disposed in the manholes and handholes of the underground cable ducts. In addition, since water is often accumulated in the manholes and handholes, the communication cable splice enclosures disposed therein also are soaked in the water through the year. Thus, many communication cable splice enclosures with worse fabrication and worse waterproof capacity must be eliminated due to permeation and malfunction. Accordingly, the communication cable splice enclosures having better waterproof/anti-humidity capacity can provide more guaranty on the transmission quality of cables, avoid the transmission hindrance, elongate the lifespan of cables, decrease enterprises' maintenance and elimination fee and increase investment benefits.

Based on the difference of waterproof mechanism between the opening of the cable entrance board and the cable, the conventional communication cable splice enclosure can be grouped as three types: heat-shrinkable type cable splice enclosure, mechanical type cable splice enclosure and elasticity shrinkable tube-shrinkable cable splice enclosure.

A cable entrance board for the heat-shrinkable type waterproof mechanism is configured on the heat-shrinkable type enclosure, and the heat-shrinkable tube, manifold clip and other components are adopted. The heat-shrinkable tube is roasted with a gasoline burner, and a waterproof structure is formed between the cylindrical member and the cable which passes through the cylindrical member and insert into the communication cable splice enclosure. The advantages of the heat-shrinkable type waterproof mechanism include that (1) it is suitable for the mid-span splicing and the straight splicing operations of the backbone cable and the branch splicing operation, (2) a few components are needed, and (3) material fee is low. However, the drawbacks include that the labor safety and public safety are influenced due to the use of the gasoline burner, construction is highly time-consuming, the construction cost is high, the gasoline burner's temperature is difficult to be controlled, the construction quality is inconsistent to result in the inconsistent waterproof capability, and the maintenance and elimination fees are high. A cable entrance board for the mechanical waterproof mechanism is configured on the mechanical communication cable splice enclosure. A fastening shell, the packing screws, the waterproof sealing tape with stickiness and plasticity, the elastic waterproof gasket and other components are used, and a water-tight seal is formed between the opening of the cable entrance board and the cable by tightening with tools. The advantages of the mechanical waterproof mechanism lies in that (1) it is suitable for the mid-span splicing and the straight splicing operations of the backbone cable and the branch splicing operation, (2) fire is not needed, and (3) safety is high. However, the drawbacks include more components in need, the higher product manufacturing cost, the more complicated construction procedures to result in the inconsistent construction quality and affect the waterproof efficiency, the higher construction cost, the higher maintenance fee and so on. A cable entrance board for the elasticity shrinkable tube-shrinkable waterproof mechanism is configured on the elasticity shrinkable tube-shrinkable communication cable splice enclosure, and an elasticity shrinkable tube is used. After the hard plastic spiral strip (i.e. ribbon) which is spirally configured on the inner wall of the elasticity shrinkable tube is removed, a waterproof structure is formed between the cylindrical member and the cable which passes through the cylindrical member and enters into the communication cable splice enclosure. The elasticity shrinkable tube is manufactured by using the elastic material having high elongation, high tensile strength and excellent elastic recovery, e.g. silicon rubber, EPDM (ethylene propylene diene monomer) and EPR (ethylene propylene rubber), etc. A plastic spiral object (i.e. ribbon) which can be removed is configured on the inner wall of the elasticity shrinkable tube to enlarge the diameter of the elasticity shrinkable tube. A part of the elasticity shrinkable tube covers the cylindrical member, and the other part thereof covers the cable which inserts through the cylindrical member. After the hard plastic spiral object is manually removed, the elasticity shrinkable tube shrinks to show an originally smaller tube diameter which is smaller than the outer diameters of the cylindrical member and the cable. By the radial elasticity and contraction force, the elasticity shrinkable tube tightly packages the cylindrical member and the cable jacket to form a water-tight seal. The advantages of the elasticity shrinkable tube-shrinkable waterproof mechanism include that it is suitable for the straight splicing operation and the branch splicing operation of the backbone cable, the fewest components are needed, the construction method is easiest, the construction fee is lowest, the construction quality is not influenced by man-made factors and is highly consistent, the waterproof efficiency is excellent, the maintenance fee is lowest, fire is not needed and safety is high. However, the drawback lies in that it is not suitable for the backbone cable with larger outer diameter, in particular in the mid-span splicing operation of the backbone cable. Although the heat-shrinkable type and the elasticity shrinkable tube-shrinkable waterproof mechanisms can be used in the straight splicing and the branch splicing operations of the backbone cable, the heat-shrinkable type waterproof mechanism is necessary when the mid-span splicing operation must be performed on the backbone cable, and the harmful effects resulted from the drawbacks of the heat-shrinkable type waterproof mechanism must be faced. In addition, a limited amount of the cylindrical members only can be configured on the cable entrance board which only has the limited surface area. When the cylindrical members are used by the straight splicing backbone cable, the number of the cylindrical members would be reduced or even is not enough. The same problem that the opening which is used in the mid-span splicing operation for the heat-shrinkable type waterproof mechanism is configured on the cable entrance board for the elasticity shrinkable tube-shrinkable waterproof mechanism also would be occurred.

Therefore, if many drawbacks (e.g. insufficient waterproof capability, costs too much, inconsistent construction quality and poor construction safety, etc.) in the current communication cable splice enclosure can be improved, the construction quality and safety not only can be enhanced, but also the enterprise' establishment and maintenance fees can be dramatically reduced.

SUMMARY

It is therefore attempted by the applicant to deal with the above situation encountered in the prior art.

For overcoming the inefficiency of the current technologies, the first purpose of the present invention is to provide a communication cable splice enclosure having at least one connecting portion, at least one hollow elongate cylindrical member and at least one connected portion, the communication cable splice enclosure comprising: at least one cable entrance board, wherein the at least one connecting portion and the at least one first hollow elongate cylindrical member are formed on the at least one cable entrance board for a communication cable to be penetrated into the communication cable splice enclosure via the at least one cable entrance board, and the communication cable to be penetrated into the at least one first hollow elongate cylindrical member is intended to form a waterproof structure by using an elastic shrinkable tube; and at least one connected portion, wherein the at least one connected portion is not formed on the at least one cable entrance board, the at least one connected portion is one selected from a group consisting of a first component intended for waterproofing with a mechanic mechanism, a second component intended for waterproofing with an elastic shrinkable tube and a combination thereof to form the waterproof structure with the communication cable which is to be penetrated into the communication cable splice enclosure via the connecting portion, and the at least one connected portion and the at least one connecting portion are combined to form the waterproof structure. Since the best waterproof mechanism of the communication cable splice enclosure is to adopt the elasticity shrinkable tube-shrinkable waterproof mechanism which has more advantages and has less drawbacks than the heat shrinkable type and the mechanical waterproof mechanism, including the advantages of the fewest components required, the low material fee, the easiest construction method, the lowest construction fee, the fewest effect of the construction quality influenced by artificial factors, the highest consistency of construction quality, the excellent waterproof efficiency, the lowest maintenance fee, fire being not essential, high safety, and the like, at least one hollow elongate cylindrical member (for the cable inserting passing therethrough and entering into the communication cable splice enclosure) is mounted on the cable entrance board, and waterproof is performed by the elasticity shrinkable tube-shrinkable waterproof mechanism. Since the mid-span splicing operation of the backbone cable enters into the communication cable splice enclosure via the cylindrical member under the situation that the cable is not cut off, such backbone cable is almost not suitable for the elasticity shrinkable tube-shrinkable waterproof mechanism. Thus, the connecting portion for introducing the cable is configured on the cable entrance board, and the connecting portion not only is suitable for the straight splicing and branch splicing operations, but also is suitable for the mid-span splicing operation of the backbone cable. Under the situation that the cable is not cut off, the mid-span splicing operation is performed by inserting the cable through the communication cable splice enclosure via the connecting portion. Since the backbone cable for the mid-span splicing operation uses the mechanical waterproof mechanism which has better advantages and has less drawbacks than the heat-shrinkable type waterproof mechanism, the communication cable splice enclosure herein further includes a connected portion, which is designed in the mechanical waterproof mechanism. Further, the waterproof structure not only can be formed between the connected portion and the cable, but also can be formed between the connected portion and the connecting portion. Since there are standard operations and technical requirements on the positions for fixation, distribution and configuration of the backbone cable and components, wiring distribution, adaptation and bending radius of cable in the communication cable splice enclosure, the positions of openings must be matched with the internal design of the communication cable splice enclosure, and the cables should be disposed at the most adequate positions which should not be changed arbitrarily. Therefore, regardless of the mid-span or the straight splicing operations, the best opening position for the backbone cable should be the same one. Thus, the connecting portion not only is suitable for the mid-span splicing operation of the backbone cable on the mechanical waterproof mechanism, but also is suitable for the straight splicing or the terminal splicing operation thereof. Furthermore, since the best waterproof mechanism for the straight or the terminal splicing operation of the backbone cable is the elasticity shrinkable tube-shrinkable waterproof mechanism, the connected portion further can be performed on the elasticity shrinkable tube-shrinkable waterproof mechanism, and a water-tight seal not only can be formed between the connected portion and the cable, but also another water-tight seal can be formed between the connected and the connecting portion. Therefore, in the communication cable splice enclosure of the present invention, the best waterproof mechanism for the capability, cost, quality and safety conditions can be selected according to the splicing and branching mechanism. In addition, the straight or the terminal splicing backbone cable can also pass through the cylindrical member, and the elasticity shrinkable tube-shrinkable waterproof mechanism is used. However, the distribution assembly in the communication cable splice enclosure must be adjusted for matching the position of the backbone cable. Furthermore, the smaller size of the communication cable splice enclosure is more suitable for the distribution and placement, and the larger amount of the openings is more suitable for the splicing and branching operations. However, since the limited number of the cylindrical members only can be configured on the limited area of the cable entrance board, the number of the cylindrical members which originally can be used in the branching cables will be reduced or even is not enough. Therefore, in the present invention, the connecting portion configured on the cable entrance board not only can be connected to the connected portion for the mechanical waterproof mechanism when the mid-span splicing operation is performed on the backbone cable, but also can be connected to the connected portion for the elasticity shrinkable tube-shrinkable waterproof mechanism when the straight or the terminal splicing operation is performed thereon. Therefore, the complicated operations to adjust and change the wiring apparatus in the communication cable splice enclosure not only can be avoided, but also the limited number of the openings can be sufficiently applied.

Furthermore, as to the communication cable splice enclosure of the invention, the at least one connecting portion and the at least one connected portion are combined through a means being one selected from a group consisting of a screw connection, a mortise joint, a wedge joint, a clamp joint, a ring fastener, a band fastener and a combination thereof. Thus, the connecting portion and the connected portion can be tightly connected.

Furthermore, as to the communication cable splice enclosure of the invention, the first component for forming the waterproof structure with the mechanic mechanism includes one selected from a group consisting of a fastening shell, a packing screw, a waterproof sealing tape with stickiness and plasticity, an elastic waterproof gasket and a combination thereof. A water-tight seal can be formed between the connected portion and the cable after the connected portion is fastened by the mechanical mechanism selected from a group consisting of a screw connection, a mortise joint, a wedge joint, a clamp joint, a ring fastener, a band fastener and a combination thereof, and another water-tight seal can be formed between the connected portion and the connecting portion.

Furthermore, as to the communication cable splice enclosure of the invention, the second component for forming the waterproof structure with the elastic shrinkable tube includes one selected from a group consisting of a second hollow elongate cylindrical member, which is not formed on the at least one cable entrance board, the elastic shrinkable tube, a waterproof sealing tape with stickiness and plasticity, an elastic waterproof gasket and a combination thereof. The connected portion is connected to the connecting portion to form a water-tight seal by one selected from a group consisting of a screw connection, a mortise joint, a wedge joint, a clamp joint, a ring fastener, a band fastener and a combination thereof, and another water-tight seal is formed between the elasticity shrinkable tube and the cable. The rubber objects such as the waterproof sealing tape, the elastic gasket, pad and so on (as like as the elasticity shrinkable waterproof gasket) not only can be disposed at the position between the connecting portion and the connected portion to form a water-tight seal, but also can be applied in filling the indents on the cylindrical member and the cable jacket. Furthermore, the waterproof sealing tape can be wound around the cable which has a much small external diameter to enlarge its external diameter as one which has a larger external diameter suitable for the elasticity shrinkable tube-shrinkable waterproof mechanism. In addition, when two or more cables are necessary to pass through the same cylindrical member, the waterproof sealing tape can be applied to wind around two or more cables and to fill the indents between the cables as the larger external diameter for the elasticity shrinkable tube-shrinkable waterproof mechanism.

Furthermore, as to the communication cable splice enclosure of the invention, the second hollow elongate cylindrical member is at least one connecting portion formed on the at least one cable entrance board. Since the straight and the terminal splicing operations are performed on many backbone cables, a water-tight seal is formed between the cylindrical member and the backbone cable when the cylindrical member is configured on the connecting portion and the elasticity shrinkable tube is only used as the connected portion. When the mid-span splicing operation is performed on the backbone cable, it is only needed that the junction between the connected and the connecting portions is not damaged so as to remove the cylindrical member. Next, the connecting portion can be connected to the connected portion for the mechanical waterproof mechanism so as to proceed the waterproof operation of the mid-span splicing backbone cable. Therefore, when the cylindrical extension is configured on the connecting portion, the number of the configuration of the cylindrical member which is not formed on the cable entrance board not only can be reduced, but also the operation for forming a waterproof structure between the cylindrical member and the connecting portion can be simplified. Furthermore, the problem of poor waterproofing resulting from the poor construction can be avoided.

Furthermore, as to the communication cable splice enclosure of the invention, the communication cable splice enclosure includes at least one first fixation device thereinside, and the at least one first fixation device fixes a jacket of the cable, which is to be introduced into the communication cable splice enclosure, thereon by using one selected from a group consisting of the ring fastener, the band fastener, the clamp joint and a combination thereof. Since the cable outside the communication cable splice enclosure is frequently shaken or pulled due to the external force and inertia and the transmission quality and the waterproof effect of the cable are further influenced, a first fixation device for fixing the jacket of the inserted cable is configured in the communication cable splice enclosure, so that a portion of the cable in the communication cable splice enclosure is not loosened by the movement of the other portion of the cable outside the communication cable splice enclosure, and thus the transmission quality and the waterproof effect of the cable are improved and assured.

Furthermore, as to the communication cable splice enclosure of the invention, the communication cable splice enclosure includes at least one second fixation device thereoutside, the at least one second fixation device comprises a first fixation portion and a second fixation portion connected to the first fixation portion, the first fixation portion is fixed on the at least one cable entrance board by using one selected from a group consisting of the screw connection, the mortise joint, the clamp joint, the ring fastener and the band fastener, and the second fixation portion fixes a jacket of the cable, which is to be introduced into the communication cable splice enclosure, on the at least one second fixation device by using one selected from a group consisting of the ring fastener, the band fastener, the clamp joint and a combination thereof. Since the cable outside the communication cable splice enclosure is frequently shaken or pulled due to the external force and inertia and the transmission quality and the waterproof effect of the cable are further influenced, a second fixation device for fixing the cable jacket which is not protected by the waterproof structure is further configured on the communication cable splice enclosure, so that the waterproof structure is prevented from being shaken or pulled by the portion of the cable which is not protected thereby to influence the waterproof effect of the waterproof structure.

Furthermore, as to the communication cable splice enclosure of the invention, the communication cable splice enclosure further includes at least one third fixation device thereinside for fixing at least one fiber optic distribution assembly rack, and the at least one third fixation device fixes the at least one fiber optic distribution assembly rack at a specific position depending on an entrance position of the at least one cable entrance board for passing therethrough a backbone fiber optic cable. Since the fixation, distribution, configuration and other operations of the backbone cable related to the fiber optic distribution assembly and the position of the relevant components have the specific pattern and the technical requirements, the positions of the openings are not adequate to be changed arbitrarily. However, the best benefit only can be obtained by changing the openings for the main cable if necessary. Therefore, a third fixation device is disposed in the communication cable splice enclosure for choosing different openings on the cable entrance board for inserting the backbone cable into the communication cable splice enclosure, and the fixation, distribution, configuration and other operations related to the fiber optic distribution assembly still can be performed according to the established technical operations, so as to decrease the disadvantageous effect resulted from the change of the openings for the backbone cable, so that the application categories of the openings of the cable entrance board can be enhanced and the technical quality of the relevant operations can be assured.

Furthermore, the communication cable splice enclosure of the invention further includes at least one fiber optic distribution assembly rack thereinside, and an entrance position of the at least one cable entrance board for passing therethrough a main fiber optic cable is configured at a position where a straight route of a backbone fiber optic cable entering into the communication cable splice enclosure is not blocked with or interrupted by a fiber optic distribution assembly of at least one fiber optic distribution assembly rack. Therefore, the problems that the cable must be bent to result in the worse transmission quality after the backbone cable enters into the communication cable splice enclosure with an insufficient space and is blocked from and interfered with the fiber optic distribution assembly are avoided. Therefore, the transmission quality of the cable is improved and the size of the communication cable splice enclosure can be minimized.

Furthermore, as to the communication cable splice enclosure of the invention, an entrance position of the at least one communication entrance board for passing therethrough a branching fiber optic cable is configured at a position where a straight route of the branching fiber optic cable entering into the communication cable splice enclosure is not blocked with or interrupted by a fiber optic distribution assembly of at least one fiber optic distribution assembly rack.

Furthermore, as to the communication cable splice enclosure of the invention, the at least one connected portion is the waterproof structure formed between the third component, which is intended for waterproofing with a heat shrinkable means, and the communication cable, which is to be penetrated into the communication cable splice enclosure via the at least one connected portion, and the third component comprises one selected from a group consisting of a third hollow elongate cylindrical member, which is not formed on the at least one cable entrance board, a heat shrinkable tube, a manifold clip, a waterproof sealing tape with stickiness and plasticity, an elastic waterproof gasket and a combination thereof. The heat-shrinkable type waterproof mechanism is adapted for the manufactures who have lower waterproofing requirements, and can be applicable at the conditions such as the low construction fee, the safety and the placement on the ground, overhead mounting, etc.

Furthermore, as to the communication cable splice enclosure of the invention, the waterproof structure between the first and the second hollow elongate cylindrical members and the communication cable, which is to be penetrated into the communication cable splice enclosure via the hollow elongate cylindrical members, can be formed by using the heat shrinkable tube.

The present invention further provides a cable splice enclosure inserting a cable therein, including: a first portion; and a second portion connected to the first portion, fixing the cable and forming a water-tight seal with the first portion.

The cable splice enclosure further includes a cable entrance board, wherein the cable entrance board has an opening inserting the cable therein, and the first portion is connected to a defining wall of the opening.

The present invention further provides a method for forming a first water-tight seal and a second water-tight seal on a telecommunication cable splice enclosure, the cable splice enclosure includes a cable entrance board having an opening, a first portion, a second portion and at least one hollow elongate cylindrical member, and the method includes steps of: (a) connecting the first portion to of the opening; (b) fixing a cable to the second portion; and (c) connecting the second portion to the first portion to form the first water-tight seal; and (d) shrinking a first elasticity shrinkable tube on the at least one hollow elongate cylindrical member and the cable to form the second water tight seal if necessary.

Furthermore, the cable entrance board includes a hollow elongate cylindrical member, and the method further includes a step (a0) of forming the opening by cutting the hollow elongate cylindrical member. In addition, the second portion includes a fastening shell and a first waterproof sealing tape, the step (b) further includes the steps of: (b1) winding the first waterproof sealing tape around a portion of the cable; and (b2) packaging the portion of the cable with the fastening shell. The second portion further includes an elastic gasket, and the step (c) further includes steps of: (c1) placing the elastic gas kit on the first portion; and (c2) connecting the second portion to the first portion.

The cable splice enclosure further includes a second elasticity shrinkable tube with an inner wall and a ribbon spirally configured on the inner wall, the second portion includes a hollow elongate cylindrical member and an elastic gasket, and the step (b) further includes steps of: (b1) passing the cable through the second elasticity shrinkable tube and the hollow elongate cylindrical member; and (b2) removing the ribbon to make the second elasticity shrinkable tube clasp the hollow elongate cylindrical member and a part of the cable in the second elasticity shrinkable tube. Alternatively, the cable splice enclosure further includes a heat shrinkable tube, and the step (b) further includes the steps of: (b1) passing the cable through the heat shrinkable tube and the second portion; and (b2) heating the heat shrinkable tube to make the heat shrinkable tube be shrunk to cover the second portion and a part of the cable in the heat shrinkable tube. The cable splice enclosure further includes a clip, the second portion comprises two parallel hollow elongate cylindrical members, and the step (b1) further comprises the steps of: (b11) passing the cable and the two parallel hollow elongate cylindrical members into the heat shrinkable tube; (b12) putting the clip between the two parallel hollow elongate cylindrical members; and (b13) performing the step (b2).

Therefore, in the present invention, the communication cable splice enclosure having the connecting portion, the hollow elongate cylindrical member and the connected portion overcomes many drawbacks (e.g. insufficient functions, too much costs, the inconsistent construction quality and poor construction safety, etc.), not only enhance the whole functions but also improve the construction quality and construction safety, and dramatically reduces the relevant enterprise' establishment and maintenance fees.

BRIEF DESCRIPTION OF THE DRAWINGS

FIGS. 6(a) to 6(d) depict the flowcharts showing the fabrication of the water-tight seal with elasticity shrinkable tube-shrinkable waterproof mechanism according to embodiment 2of the present invention.

FIG. 8(a) depicts a diagram showing a communication cable splice enclosure according to embodiment 3of the present invention.

FIG. 8(b) depicts a cable entrance board of the communication cable splice enclosure and the first portion configured on the cable entrance board, wherein the cylindrical member is integrally formed on the cable entrance board.

FIG. 8(c) depicts a diagram showing each of two heat-shrinkable tubes packaged on a cylindrical member and a cable.

DETAILED DESCRIPTION OF THE PREFERRED EMBODIMENTS

The present invention will now be described more specifically with reference to the following Embodiments. It is to be noted that the following descriptions of preferred Embodiments of this invention are presented herein for purpose of illustration and description only; it is not intended to be exhaustive or to be limited to the precise form disclosed.

Embodiment 1

Figure 1:
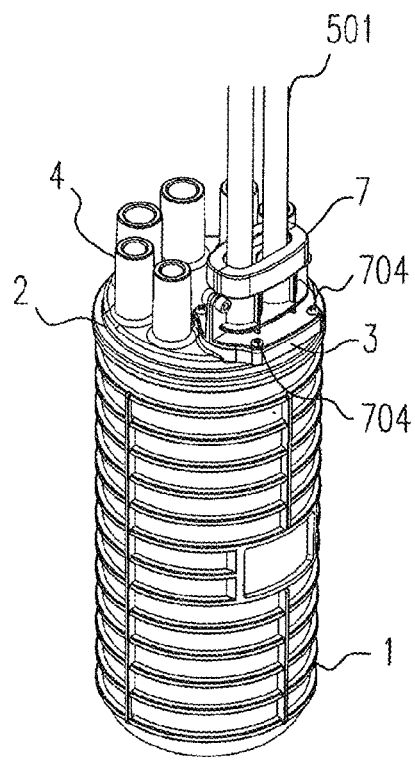
FIG. 1 depicts a diagram showing a communication cable splice enclosure according to embodiment 1of the present invention, and the mechanical waterproof mechanism is performed on the communication cable splice enclosure.
Figure 2:
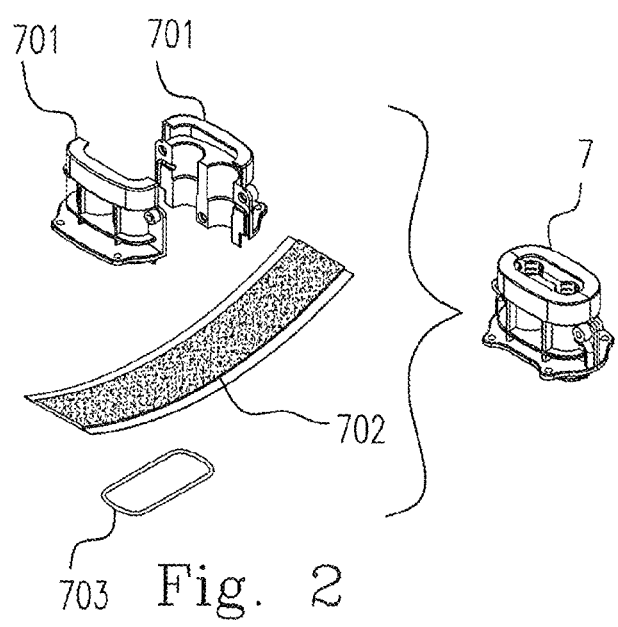
FIG. 2 depicts a diagram showing the components of a second portion.
Figure 3A:
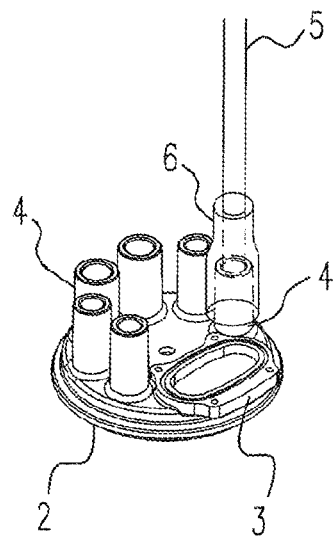
FIGS. 3(a) to 3(d) depict the flowcharts showing the fabrication of the mechanical water-tight seal according to embodiment 1of the present invention.
Figure 3B:
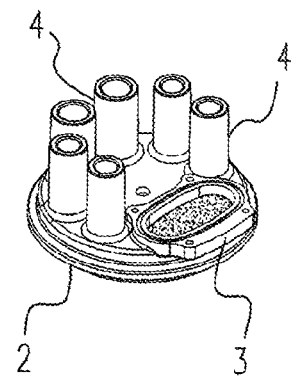
Figure 3C:
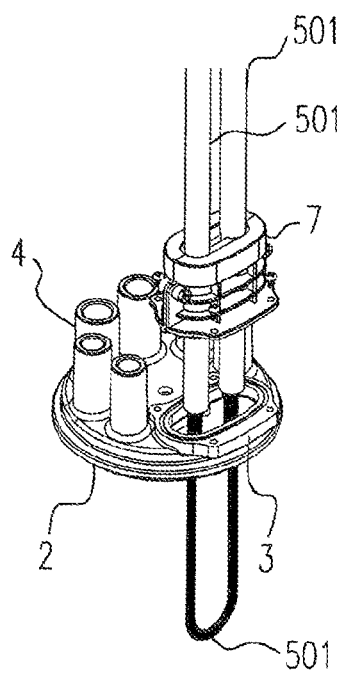
Figure 3D:
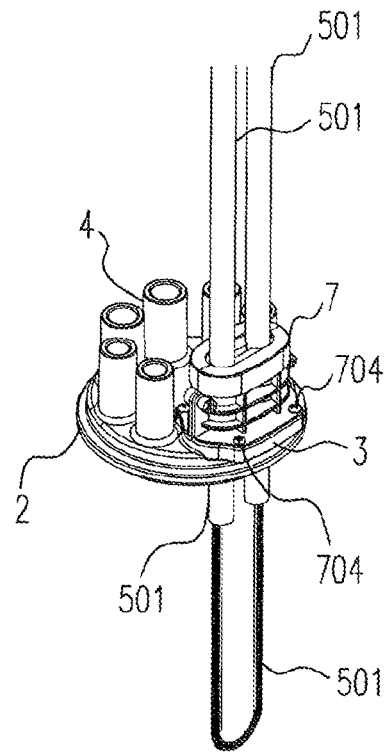

Please refer to FIG. 1, which depicts a diagram showing a communication cable splice enclosure according to embodiment 1of the present invention. The communication cable splice enclosure 1 includes a cable entrance board 2, wherein a first portion (i.e. the connecting portion) 3 and six hollow elongate cylindrical members 4 are configured thereon. A communication cable 501 inserts into the communication cable splice enclosure 1 via the opening of the cable entrance board 2 (FIG. 3(a)). An elasticity shrinkable tube-shrinkable waterproof structure is formed among the hollow elongate cylindrical member 4, the elasticity shrinkable tube 6 and the inserted cable 5 (FIG. 3(a)). In addition, the communication cable splice enclosure 1 further includes a second portion (i.e. the connected portion) 7 (FIGS. 1, 2, 3(b), 3(c) and 3(d)), which is designed to be waterproofed with the mechanical waterproof mechanism. The second portion 7 includes a fastening shell 701, a malleable waterproof sealing tape 702, and an elastic gasket 703 (FIG. 2). The waterproof sealing tape 702 is tightly wound around the jacket of the cable 501 which is intended to proceed the mid-span splicing operation and is not cut off, and the waterproof sealing tape 702 is disposed on the inner surface of the fastening shell 701. Next, the waterproof sealing tape 701 is tightly covered on the backbone cable 501 by the screwed joint, so that a water-tight seal is formed between the fastening shell 701 and the backbone cable 501. The elastic gasket 703 is disposed between the first portion 3 and the fastening shell 701, and the backbone cable 501 inserts into the communication cable splice enclosure 1 via the first portion 3. The second portion 7 and the first portion 3 are fixed with the screws 704 to form a water-tight seal (FIG. 3(d)). Therefore, in the communication cable splice enclosure of the present invention, the non-mid-span splicing cable is suitable for waterproofing with the elasticity shrinkable tube, while the mid-span splicing cable is suitable for waterproofing with mechanical waterproof mechanism. Thus, both the non-mid-span splicing and the mid-span splicing cables can be most efficiently and conveniently waterproofed.

Embodiment 2

Figure 4:
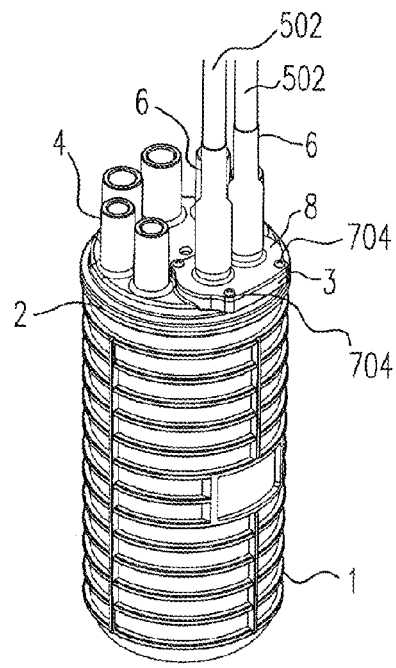
FIG. 4 depicts a diagram showing a communication cable splice enclosure according to embodiment 2of the present invention, and elasticity shrinkable tube-shrinkable waterproof mechanism is performed on the communication cable splice enclosure.
Figure 5:
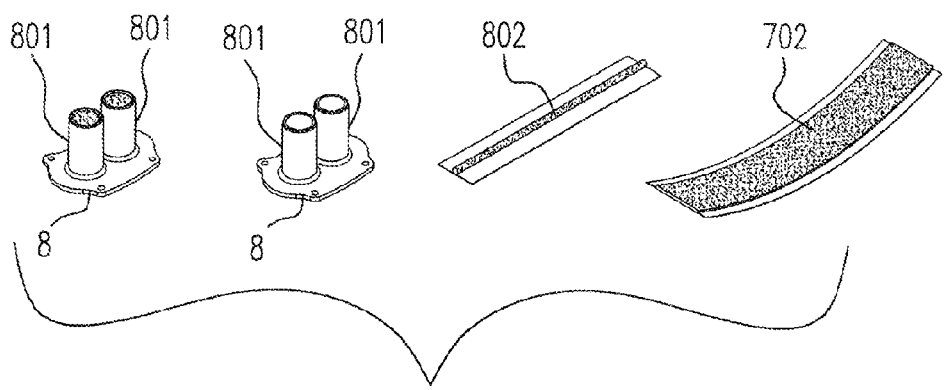
FIG. 5 depicts a diagram showing the components of a second portion which includes two hollow elongate cylindrical members.
Figure 7B:
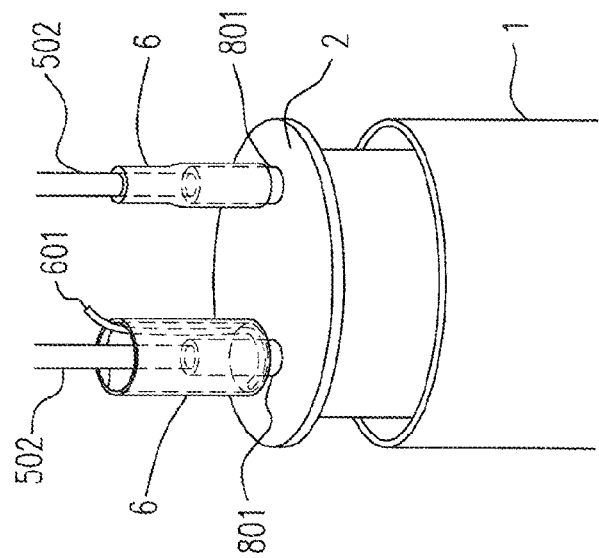
FIG. 7(b) depicts a diagram showing the operation of the elasticity shrinkable tube to package the cylindrical member and the cable.
Figure 7A:
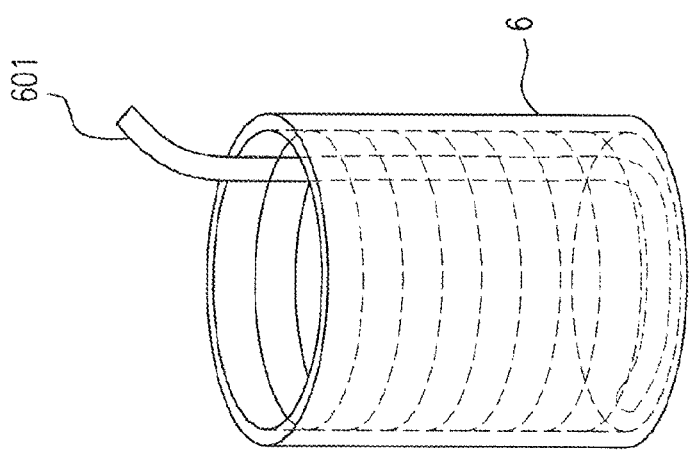
FIG. 7(a) depicts a diagram showing the elasticity shrinkable tube including a ribbon spirally configured on the inner wall of the elasticity shrinkable tube.

Please refer to FIG. 4, which depicts a diagram showing a communication cable splice enclosure according to embodiment 2of the present invention, wherein the second portion is intended to proceed the waterproofing with the elasticity shrinkable tube, and other components are the same with those in the communication cable splice enclosure 1 of embodiment 1. The second portion 8 includes the hollow elongate cylindrical member 801 which is not configured on the cable entrance board 2, an elasticity shrinkable tube 6, and a waterproof sealing tape 802 (FIGS. 4 and 5). The waterproof sealing tape 802 is disposed between the first portion 3 and the cylindrical member 801 of the second portion 8, and then the first portion 3 and the cylindrical member 801 are fixed with the screws 704 to form a water-tight seal (FIGS. 6(a) and 6(b)). Please also refer to the operation diagrams of the elasticity shrinkable tube in FIGS. 6(c), 6(d), 7(a) and 7(b), the straight splicing (non-mid-span) backbone cable 502 passes through the elasticity shrinkable tube 6, and then the backbone cable 502 enters into the communication cable splice enclosure 1 by inserting through the cylindrical member 801 and the first portion 3. Subsequently, the elasticity shrinkable tube 6 is disposed at the position which can simultaneously cover the cylindrical member 801 and the backbone cable 502. After the hard plastic spiral object 601 configured on the inner wall of the elasticity shrinkable tube 6 is removed manually (FIGS. 7(a) and 7(b)), the elasticity shrinkable tube 6 immediately shrinks to tightly cover the cylindrical member 801 and the backbone cable 502, and a water-tight seal is formed therebetween (FIGS. 6(c) and 6(d)). Therefore, in the communication cable splice enclosure of embodiment 2of the present invention, the best waterproofing operation can be performed when the backbone cables belong to the mid-span splicing operation, and it is also used for the elasticity shrinkable tube-shrinkable waterproof mechanism on the non-mid-span splicing cables. At the same time, when the backbone cable (in particular the backbone optic cable) is used in the mid-span or the straight splicing operation and the same opening (cable entrance) for cable is used, the best waterproof mechanism still can be used to overcome the insufficiency of the current technologies and to avoid the complicated operations that the wiring apparatus in the communication cable splice enclosure must be adjusted due to the changed opening (cable entrance) position for the backbone cable. Furthermore, the limited amounts of openings (cable entrance) are sufficiently used. Therefore, in the communication cable splice enclosure of the present invention, the best waterproof mechanism for capability, cost, quality and safety can be selected according to the different cable splicing and branching mechanism, so that the insufficiency of the current technologies can be improved and overcome.

Embodiment 3

Please refer to FIG. 8(a), which depicts a diagram showing a communication cable splice enclosure according to embodiment 3of the present invention. The difference between the communication cable splice enclosures of embodiments 1 and 2 lies in that the cylindrical member 301 in embodiment 3is integrally formed on the first portion 3 of the cable entrance board (FIG. 8(b)). When the straight splicing backbone cable 502 is inserted, the waterproofing operation can be accomplished by only configuring the elasticity shrinkable tube 6 (FIG. 8(c)) (when the mid-span splicing operation must be performed on the backbone cable, at the condition that the first portion-the second portion junction is not destroyed, the cylindrical member which is integrally formed on the inner edge of the first portion of the cable entrance board can be easily sawn off, and the first portion can be connected to the "mechanical-waterproof" second portion, so that the waterproofing operation on the mid-span splicing backbone cable is performed). Therefore, the cylindrical member 301 which is integrally formed on the first portion not only can simplify the configuration of the cylindrical member, but also can simplify the operation procedure of the waterproofing structure formed between the cylindrical member and the first portion. Furthermore, it can avoid the poor waterproofing that occurs at the junction due to poor construction.

Embodiment 4

Figure 9:
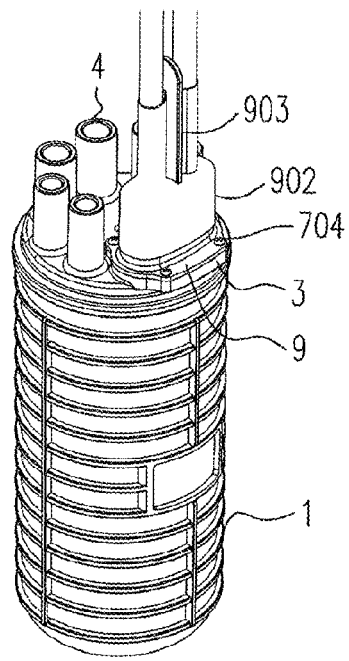
FIG. 9 shows a diagram showing a communication cable splice enclosure according to embodiment 4of the present invention.
Figure 10:
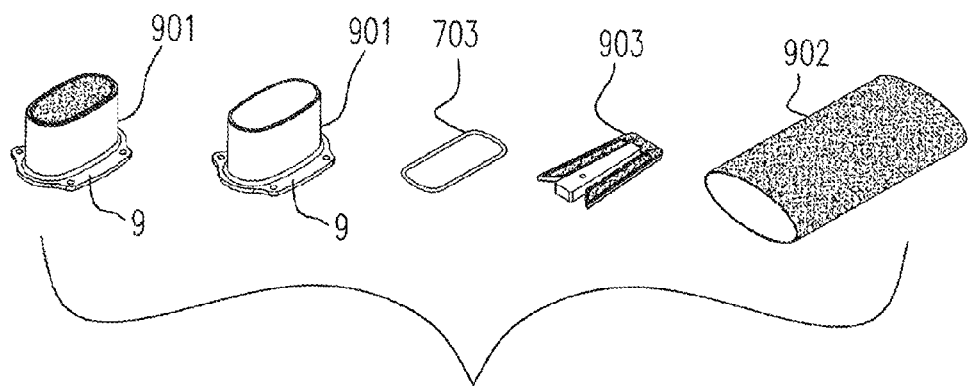
FIG. 10 shows the components of a second portion which mainly includes a manifold clip and a heat-shrinkable tube.
Figure 11A:
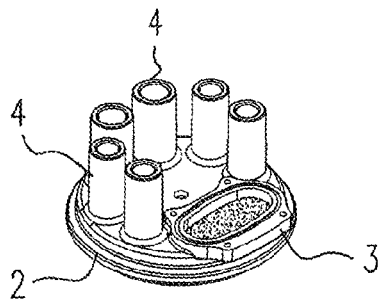
FIGS. 11(a) to 11(f) depict the flowcharts showing the fabrication of the water-tight seal with the heat-shrinkable type waterproof mechanism according to embodiment 4of the present invention.
Figure 11B:
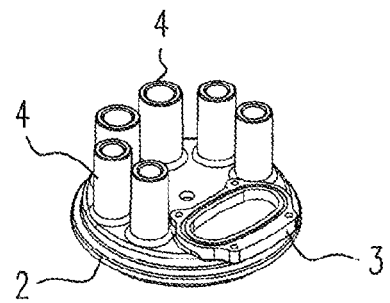
Figure 11C:
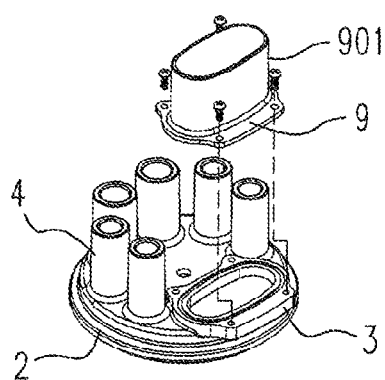
Figure 11D:
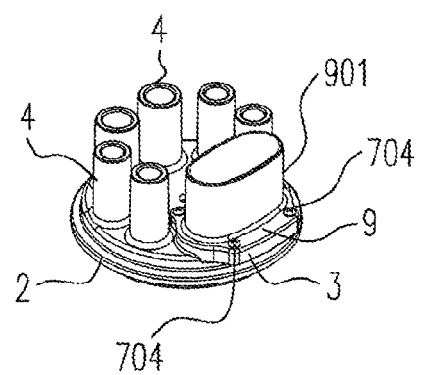
Figure 11E:
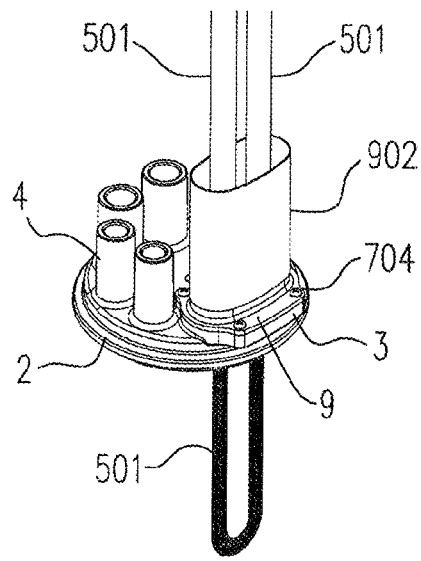
Figure 11F:
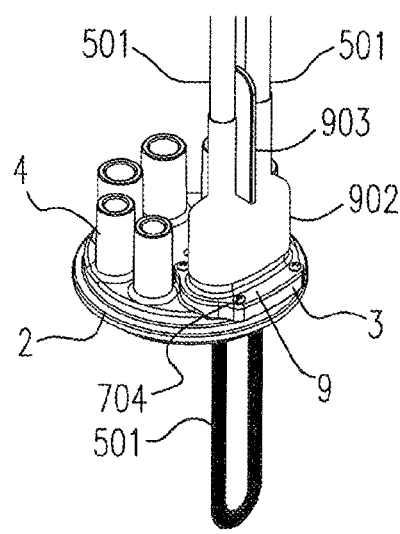

Please refer to FIG. 9, which depicts a diagram showing a communication cable splice enclosure according to embodiment 4of the present invention. The components and the corresponding reference numerals in embodiment 4are the same with those in embodiment 1of the present invention except that the second portion 9 is designed for the heat-shrinkable type waterproof mechanism. The second portion 9 includes a cylindrical member 901, a heat-shrinkable tube 902, a manifold clip 903 and an elastic gasket 703 (FIG. 10). After the elastic gasket 703 is disposed between the first portion 3 and the cylindrical member 901, a water-tight seal is formed between the first portion 3 and the cylindrical member 901 by tightening with screws 704 (FIGS. 11(a) to 11(d)). Next, the backbone cable 501 passes through the cylindrical member 901 and the first portion 3 to insert into the communication cable splice enclosure 1, and the heat-shrinkable tube 902 is disposed at the position that the cylindrical member 901 and the un-fixed portion of the backbone cable 501 is covered. Subsequently, the manifold clip is configured to dispose at the area between two backbone cables 501 and to clasp on the heat-shrinkable tube 902. The heat-shrinkable tube 902 is evenly roasted with the gasoline burner to completely package the cylindrical member 901 and the jacket of the backbone cable 501. After cooling, a water-tight seal is formed between the cable and the heat-shrinkable tube (FIGS. 11(e) and 11(f)). The heat-shrinkable type waterproof mechanism is adapted for the manufactures who only have lower waterproofing requirements (e.g. IP-65), and can be applicable at the conditions such as the low construction fee, where fire is allowed and overhead mounting, etc.

Embodiment 5

Figure 12:
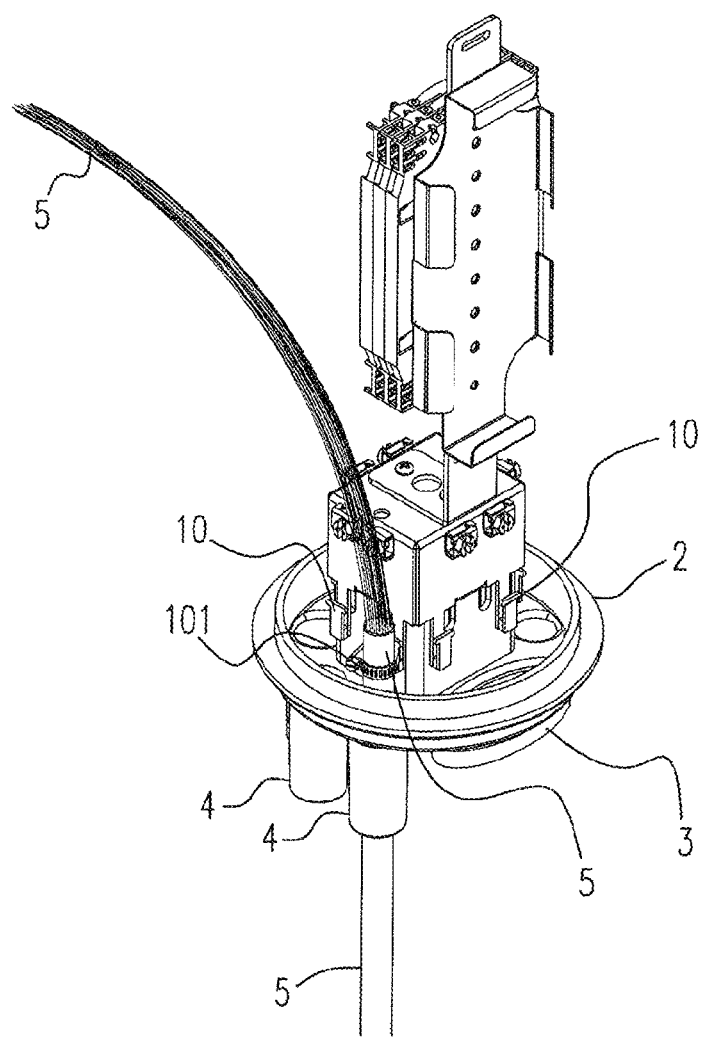
FIG. 12 depicts a diagram showing a first fixation device of the communication cable splice enclosure according to embodiment 5of the present invention.

Please refer to FIG. 12, which depicts a diagram showing a communication cable splice enclosure according to embodiment 5of the present invention. A first fixation device 10 for fixing the cable is disposed in the communication cable splice enclosure, and the first fixation device 10 fixes the jacket of the cable 5 using the stainless steel ring fastener 101, so that the cable 5 in the communication cable splice enclosure 1 avoids being loosened by the movement of the portion of the cable 5 outside the communication cable splice enclosure 1.

Embodiment 6

Figure 13:
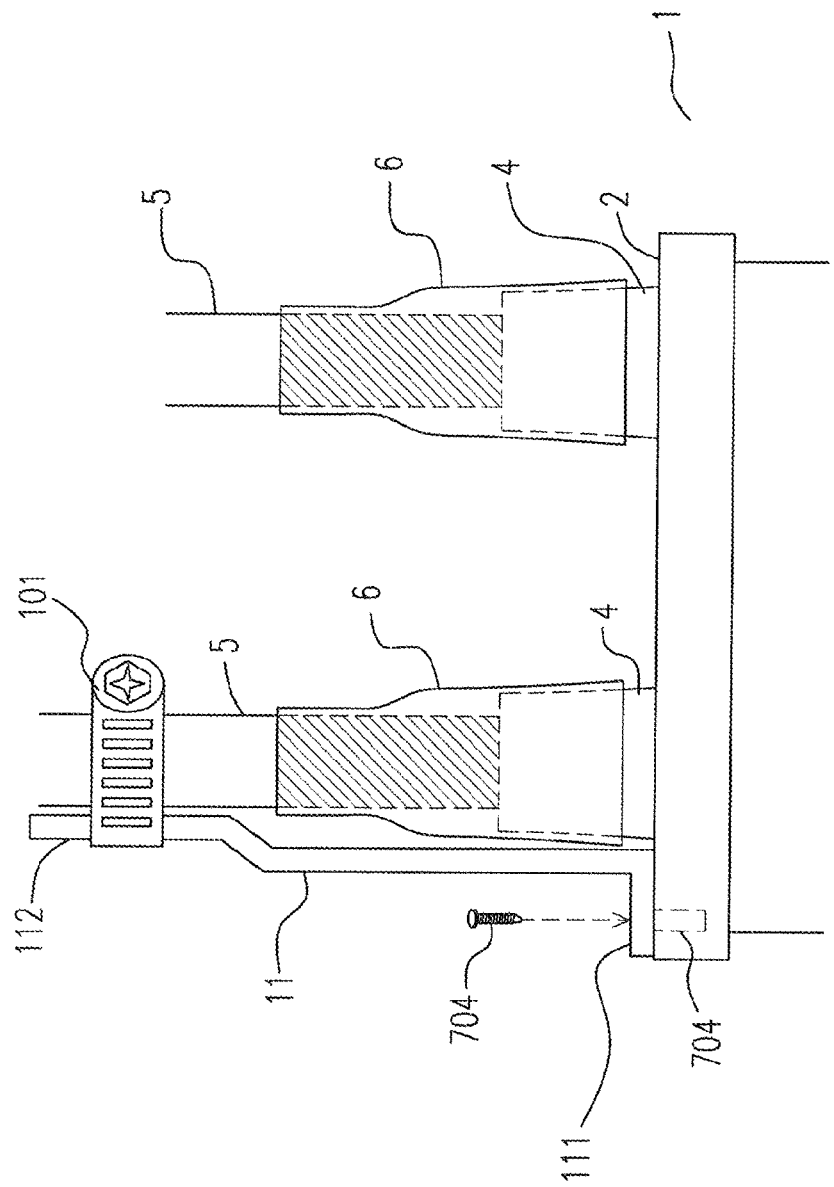
FIG. 13 depicts a diagram showing a second fixation device of the communication cable splice enclosure according to embodiment 6of the present invention.

Please refer to FIG. 13, which depict a diagram showing a second fixation device of the communication cable splice enclosure for fixing the cable according to embodiment 6of the present invention. The second fixation device 11 includes a first fixation portion 111 and a second fixation portion 112 connected to the first fixation portion 111. The second fixation device 11 is fixed on the cable entrance board 2 with first fixation portion 111 by the screw 704, and the portion of the cable 5 which is not protected by the elasticity shrinkable tube 6 is fixed with the stainless ring fastener 101. The water-tight seal configured on the cable entrance board 2 avoids being loosened by the movement of the cable 5 outside the communication cable splice enclosure 1, and thus the waterproof efficiency on the cable is assured.

Embodiment 7

Figure 14A:
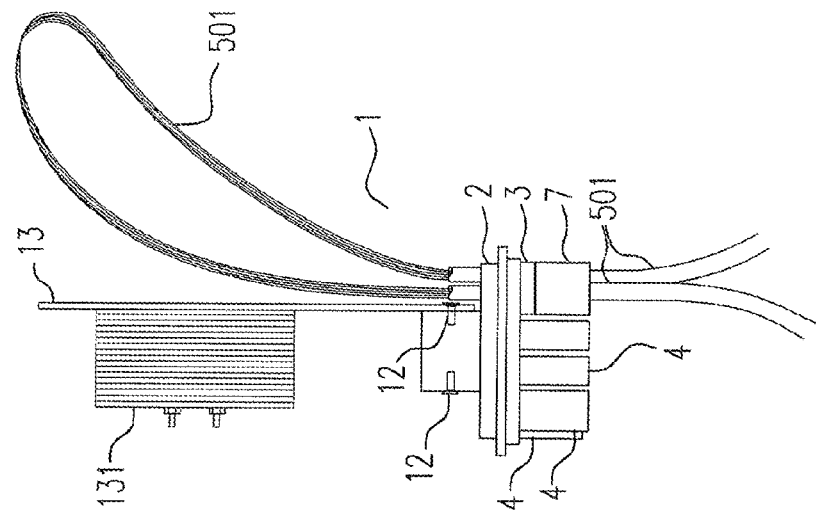
FIGS. 14(a) and 14(b) depict the explored diagrams showing a third fixation device of the communication cable splice enclosure according to embodiment 7 of the present invention, wherein the straight route of the backbone cable is not blocked with or interfered from the fiber optic distribution assembly.
Figure 14B:
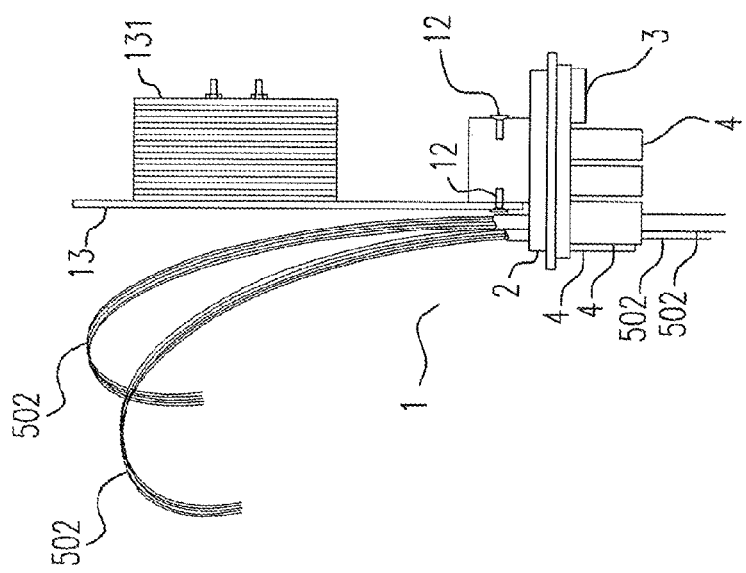
Figure 15:
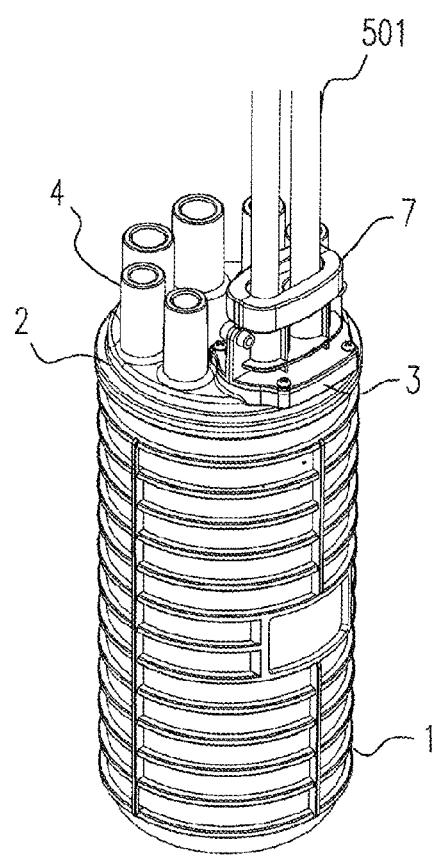
FIGS. 15, 16(a) to 16(c), 17(a) to 17(b) and 18(a) to 18(c) depict various communication cable splice enclosures with different shapes, sizes and structures according to embodiment 8of the present invention.
Figure 16C:
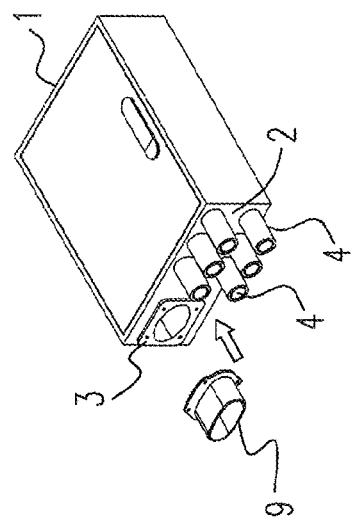
Figure 16B:
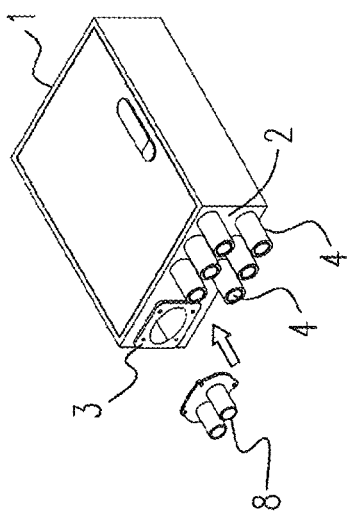
Figure 16A:
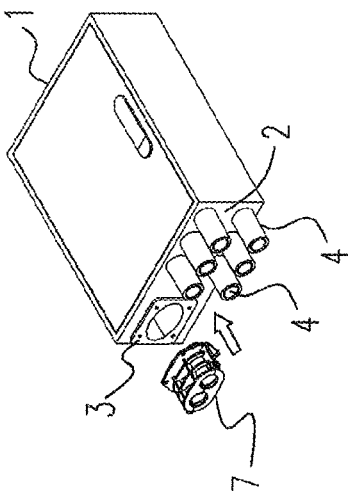
Figure 17A:
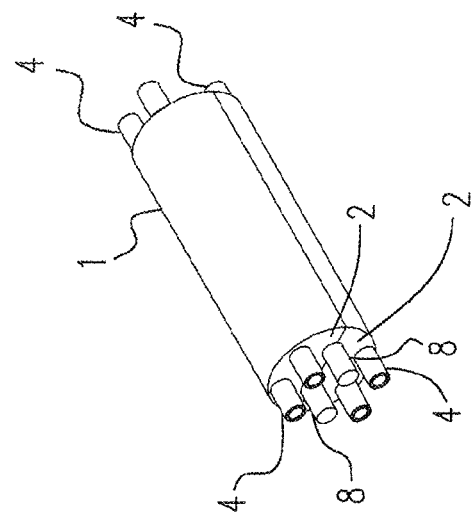
Figure 17B:
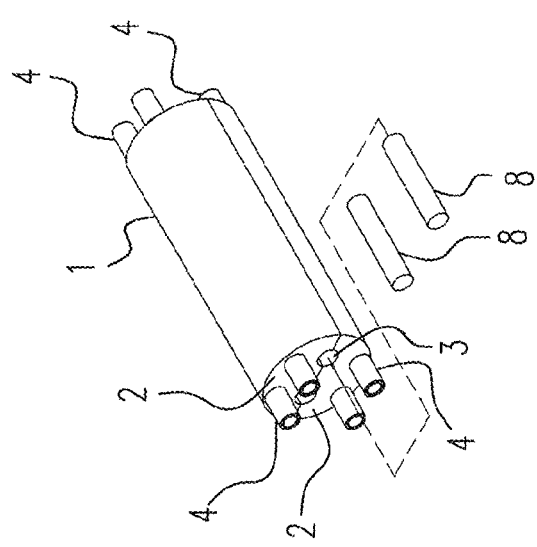
Figure 18A:
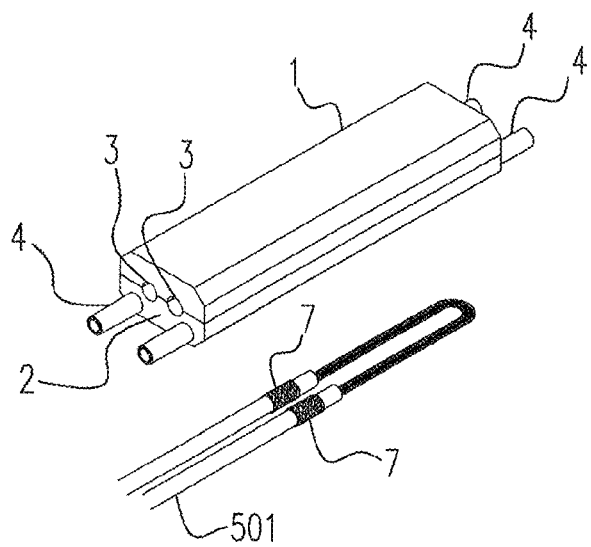
Figure 18B:
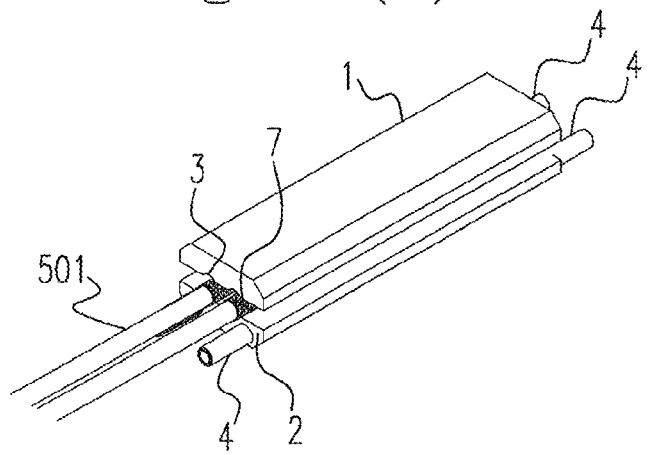
Figure 18C:
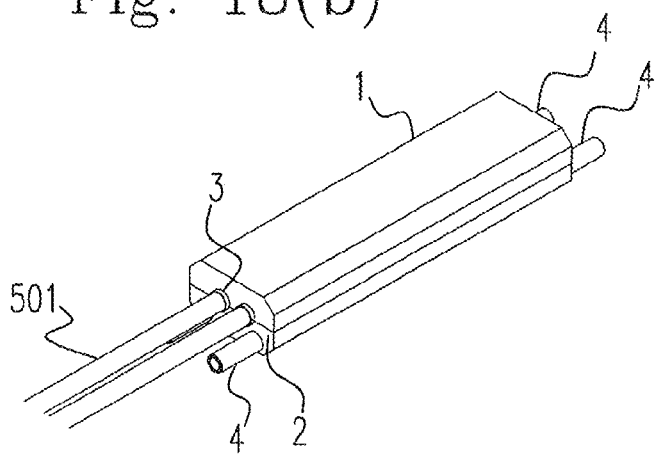

Please refer to FIGS. 14(a) and 14(b), which depict diagrams showing a third fixation device of the communication cable splice enclosure according to embodiment 7of the present invention. A third fixation device 12 is configured on the rear surface of the cable entrance board 2 to fix the fiber optic distribution assembly rack 13, and the third fixation device 12 fixes the fiber optic distribution assembly rack 13 on the cable entrance board 2 based on the different positions of the openings 3 and 4, so that the backbone cables 501 and 502 can choose the opening 3 or 4 to insert into the communication cable splice enclosure 1, and the fixation, distribution, configuration and other operations for the fiber optic distribution assembly rack 13 still can be performed according to the established techniques. Therefore, the drawbacks resulted from the alternation of the openings 3 and 4 are decreased, the application scopes of the openings 3 and 4 are improved, and the technical quality of the relevant operations are assured. In addition, in the communication cable splice enclosure 1 of embodiment 7, the openings 3 and 4 are disposed on the straight route which the backbone cables 501 and 502 enter into the communication cable splice enclosure 1. The straight route is not blocked from and interfered with the fiber optic distribution assembly rack 131. The problem of the bent backbone cables 501 and 502 due to the interference of the fiber optic distribution assembly 131 which results in the worse transmission quality is overcome, so that the transmission quality of the cable is improved and the size of the communication cable splice enclosure 1 could be minimized.

Embodiment 8

Please refer to FIGS. 15, 16(a) to 16(c), 17(a) to 17(b) and 18(a) to 18(c), which depict the various communication cable splice enclosures according to embodiment 8 of the present invention. The shape, size and structure of the communication cable splice enclosure 1 can be designed on demand, and the first portion 3 and the cylindrical member 4 are configured on the cable entrance board 2. The communication cable which passes through the cylindrical member 4 can form the waterproof structure with the elasticity shrinkable tube, and the waterproof structure is formed by connecting the first portion 3 to the second portion 7, 8 or 9. Furthermore, the second portion can adopt the mechanical waterproof mechanism, the elasticity shrinkable tube-shrinkable waterproof mechanism, or even the heat-shrinkable type waterproof mechanism to form the waterproof structure between the second portion and the cable which inserts into the communication cable splice enclosure 1. The techniques disclosed in the present invention can be adopted to enhance the overall capabilities, and the construction quality and the construction safety are enhanced. Thus, the establishment and maintenance fees of the relevant enterprises can be dramatically reduced.

Based on the above descriptions of embodiments 1 to 8, many drawbacks, e.g. the insufficient capability, the high cost, the inconsistent construction quality and poor construction safety, in the current techniques are overcome by the communication cable splice enclosure of the present invention. The overall functions of the communication cable splice enclosure not only are enhanced, but also the construction quality and safety are improved. Furthermore, the establishment and maintenance fees of the enterprises are dramatically decreased.

While the invention has been described in terms of what is presently considered to be the most practical and preferred Embodiments, it is to be understood that the invention needs not be limited to the disclosed Embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A telecommunication cable splice enclosure, comprising:
    a cable entrance board comprising a first portion and at least one first hollow elongate cylindrical member configured on the cable entrance board for inserting therethrough the cable if necessary, a water-tight seal formed with an elasticity shrinkable tube, the at least one first hollow elongate cylindrical member and the cable inserting therethrough the at least one first hollow elongate cylindrical member; and
    a second portion able to be connected to the first portion, being at least one of a mechanical waterproof mechanism and an elasticity shrinkable tube-shrinkable waterproof mechanism, wherein the second portion can form a water-tight seal with the second portion and the cable inserting therethrough the first portion and the cable splice enclosure, and the second portion can form a water-tight seal with the first portion.

2. The telecommunication cable splice enclosure according to claim 1, wherein the mechanical waterproof mechanism is one selected from a group consisting of a screw connection, a mortise joint, a wedge joint, a clamp joint, a ring fastener, a band fastener and a combination thereof.

3. The telecommunication cable splice enclosure according to claim 1, wherein the second portion comprises a fastening shell, a first waterproof sealing tape and an elastic gasket, the elastic gasket is disposed on the first portion, the first waterproof sealing tape is configured to wind around a portion of the cable, and the fastening shell is configured to clamp the portion and to be fixed to the first portion.

4. The telecommunication cable splice enclosure according to claim 3, wherein the second portion further comprises a second waterproof sealing tape, the fasten shell comprises an inner surface, and the second waterproof sealing tape is disposed on the inner surface.

5. The telecommunication cable splice enclosure according to claim 1 further comprising a second elasticity shrinkable tube covering the second portion and a part of the cable in the second elasticity shrinkable tube.

6. The telecommunication cable splice enclosure according to claim 5, wherein the second elasticity shrinkable tube comprises an inner wall and a ribbon spirally configured on the inner wall, the second portion comprises a hollow elongate cylindrical member and an elastic gasket, the elastic gasket is disposed on the first portion, and the second portion is fixed to the first portion by the mechanical waterproof mechanism.

7. The telecommunication cable splice enclosure according to claim 1 further comprising a first fixation device disposed in the cable splice enclosure and fixing the cable by one selected from a group consisting of a clamp joint, a ring fastener, a band fastener and a combination thereof.

8. The telecommunication cable splice enclosure according to claim 1 further comprising a second fixation device comprising a first fixation portion and a second fixation portion connected with each other, and disposed on the cable splice enclosure, wherein the first fixation portion is effective in fixing to the cable entrance board by one selected from a group consisting of a screw connection, a mortise joint, a first clamp joint, a first ring fastener, a first band fastener and a combination thereof, and the cable is effective in fixing to the second fixation portion by one selected from a group consisting of a second clamp joint, a second ring fastener, a second band fastener and a combination thereof.

9. The telecommunication cable splice enclosure according to claim 1 further comprising:
    a fiber optic distribution assembly disposed therein; and
    a third fixation device fixing the fiber optic distribution assembly.

10. The telecommunication cable splice enclosure according to claim 1 further comprising a heat shrinkable tube configured to cover the second portion and a part of the un-fixed portion of the cable, wherein the cable is configured to insert through the heat shrinkable tube and the second portion.

11. The telecommunication cable splice enclosure according to claim 10 further comprising a clip, wherein the first portion comprises two parallel hollow elongate cylindrical members for passing the cable through one of the two parallel hollow elongate cylindrical members and reversely passing the cable through the other one of the two parallel hollow elongate cylindrical members, the two parallel hollow elongate cylindrical members are configured in the heat shrinkable tube, and the clip is disposed in an area between the heat shrinkable tube and the cable, and the clip is effective in clasping the heat shrinkable tube upon roasting the heat shrinkable tube.

12. A cable splice enclosure inserting a cable therein, comprising:
   a first portion; and
   a second portion connected to the first portion, fixing the cable and forming a water-tight seal with the first portion.

13. The cable splice enclosure according to claim 12 further comprising a cable entrance board, wherein the cable entrance board has an opening inserting the cable therein, and the first portion is connected to a defining wall of the opening.

14. A method for forming a first water-tight seal and a second water-tight seal on a telecommunication cable splice enclosure, the cable splice enclosure comprising a cable entrance board having an opening, a first portion, a second portion and at least one hollow elongate cylindrical member, the method comprising steps of:
   (a) connecting the first portion to of the opening;
   (b) fixing a cable to the second portion; and
   (c) connecting the second portion to the first portion to form the first water-tight seal; and
   (d) shrinking a first elasticity shrinkable tube on the at least one hollow elongate cylindrical member and the cable to form the second water tight seal if necessary.

15. The method according to claim 14, wherein the cable entrance board comprises a hollow elongate cylindrical member, and the method further comprises a step (a0) of forming the opening by cutting the hollow elongate cylindrical member.

16. The method according to claim 14, wherein the second portion comprises a fasten shell and a first waterproof sealing tape, the step (b) further comprises the steps of:
   (b1) winding the first waterproof sealing tape around a portion of the cable; and
   (b2) packaging the portion of the cable with the fasten shell.

17. The method according to claim 16, wherein the second portion further comprises an elastic gasket, and the step (c) further comprises steps of:
   (c1) placing the elastic gas kit on the first portion; and
   (c2) connecting the second portion to the first portion.

18. The method according to claim 15, wherein the cable splice enclosure further comprises a second elasticity shrinkable tube with an inner wall and a ribbon spirally configured on the inner wall, the second portion comprises a hollow elongate cylindrical member and an elastic gasket, and the step (b) further comprises steps of:
   (b1) passing the cable through the second elasticity shrinkable tube and the hollow elongate cylindrical member; and
   (b2) removing the ribbon to make the second elasticity shrinkable tube clasp the hollow elongate cylindrical member and a part of the cable in the second elasticity shrinkable tube.

19. The method according to claim 15, wherein the cable splice enclosure further comprises a heat shrinkable tube, and the step (b) further comprises the steps of:
   (b1) passing the cable through the heat shrinkable tube and the second portion; and
   (b2) heating the heat shrinkable tube to make the heat shrinkable tube be shrunk to cover the second portion and a part of the cable in the heat shrinkable tube.

20. The method according to claim 19, wherein the cable splice enclosure further comprises a clip, the second portion comprises two parallel hollow elongate cylindrical members, and the step (b1) further comprises the steps of:
   (b11) passing the cable and the two parallel hollow elongate cylindrical members into the heat shrinkable tube;
   (b12) putting the clip between the two parallel hollow elongate cylindrical members; and
   (b13) performing the step (b2).

* * * * *